(12) United States Patent
Yamazaki et al.

(10) Patent No.: US 6,760,810 B2
(45) Date of Patent: Jul. 6, 2004

(54) DATA PROCESSOR HAVING INSTRUCTION CACHE WITH LOW POWER CONSUMPTION

(75) Inventors: Yasuhiro Yamazaki, Kawasaki (JP); Taizoh Satoh, Kawasaki (JP); Hiroyuki Utsumi, Kawasaki (JP); Hitoshi Yoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 280 days.

(21) Appl. No.: 10/023,905

(22) Filed: Dec. 21, 2001

(65) Prior Publication Data

US 2002/0080662 A1 Jun. 27, 2002

(30) Foreign Application Priority Data

Dec. 22, 2000 (JP) ........................................ 2000-391369

(51) Int. Cl.[7] .............................................. G06F 12/00
(52) U.S. Cl. ...................................................... 711/125
(58) Field of Search ................................ 711/118, 125; 713/322, 323, 324

(56) References Cited

U.S. PATENT DOCUMENTS

| | | | | |
|---|---|---|---|---|
| 5,018,061 A | * | 5/1991 | Kishigami et al. ............. | 711/3 |
| 5,029,126 A | * | 7/1991 | Yamaguchi .................... | 365/49 |
| 5,715,426 A | * | 2/1998 | Takahashi et al. ........... | 711/128 |
| 5,724,611 A | | 3/1998 | Evoy | |
| 5,845,309 A | * | 12/1998 | Shirotori et al. ................ | 711/3 |
| 5,913,223 A | * | 6/1999 | Sheppard et al. ............ | 711/118 |
| 5,974,505 A | | 10/1999 | Kuttanna et al. | |
| 5,983,310 A | | 11/1999 | Adams | |
| 6,021,461 A | * | 2/2000 | Dhong et al. ................. | 711/105 |
| 6,138,208 A | | 10/2000 | Dhong | |
| 6,356,990 B1 | * | 3/2002 | Aoki et al. .................... | 711/205 |
| 6,412,059 B1 | * | 6/2002 | Matsuyama .................. | 711/204 |
| 6,449,694 B1 | * | 9/2002 | Burgess et al. .............. | 711/128 |
| 6,535,959 B1 | * | 3/2003 | Ramprasad et al. .......... | 711/125 |
| 6,549,986 B1 | * | 4/2003 | Spence ......................... | 711/125 |

FOREIGN PATENT DOCUMENTS

| | | |
|---|---|---|
| JP | 7-334423 | 12/1995 |
| JP | 11-184752 | 7/1999 |

* cited by examiner

*Primary Examiner*—Kevin L. Ellis
(74) *Attorney, Agent, or Firm*—Staas & Halsey LLP

(57) ABSTRACT

The present invention provides a data processor including an instruction cache that can operate at low power consumption, avoiding useless power consumption. The data processor includes a plurality of cache memory units, wherein only a cache memory unit that stores a demanded instruction is enabled, while other memory units are disabled.

4 Claims, 12 Drawing Sheets

DATA PROCESSOR HAVING INSTRUCTION CACHE WITH LOW POWER CONSUMPTION

BACKGROUND OF THE INVENTION

1. Field of the Invention

The present invention generally relates to a data processor, and specifically relates to a data possessor such as a microprocessor and an image processor that include an instruction cache.

2. Description of the Related Art

Conventionally, various processors take in an instruction from an external memory (RAM), and execute the instruction by an execution unit.

FIG. 1 is a block diagram showing this kind of microprocessors. A microprocessor 10 has an execution unit 11. The execution unit 11 executes an instruction stored in an external RAM 12, which functions as an external memory, by the following procedure. First, the execution unit 11 outputs an instruction address to the external RAM 12 (step 1), and receives a corresponding instruction (step 2). Then, the execution unit 11 analyzes and executes the instruction (step 3). In that event, the execution unit 11 outputs the data address to the external RAM 12 (step 4) in order to read and write data, and reads and writes the data (step 5). Here, the operation in the steps 4 and 5 may be omitted depending on instructions.

With the configuration of FIG. 1, it is necessary to access the external RAM 12 every time an instruction is executed, causing a problem that the execution of the instruction takes time.

In order to solve this problem, practices have been to provide an instruction cache 13 in a microprocessor 10A as shown in FIG. 2. When the instruction cache 13 does not contain an instruction required, the instruction is read from the external RAM 12 according to the procedure of steps 1 and 2 and supplied to the execution unit 11, and the instruction is stored in the instruction cache 13. When the execution unit 11 requires the same instruction afterwards, the corresponding instruction is read from the instruction cache 13 which received the instruction address, and the instruction is supplied to the execution unit 11. Since the time to access the instruction cache 13 is generally shorter than time to access the external RAM 12, time until an instruction is read and executed can be shortened.

FIG. 3 is a block diagram showing configuration of the instruction cache 13 shown in FIG. 2. The instruction cache 13 has an instruction address register 14, two units of tag RAM 15 and 16, two units of cache RAM 17 and 18, 2 comparators 19 and 20, a hit/miss checking logic circuit 21, and a selector 22. The tag RAM 15 and the cache RAM 17 are interlocking (system #0), and the tag RAM 16 and the cache RAM 18 are interlocking (system #1).

The instruction cache 13 receives an instruction address from the execution unit 11 shown in FIG. 2, and outputs a corresponding instruction through the selector 22. The instruction address is sent to the external RAM 12, and a corresponding block is received from the external RAM. A block is a group of a plurality of instructions specified by continuous addresses.

FIG. 4 shows instructions that are executed sequentially. In FIG. 4, the instructions are specified by continuous instruction addresses except for the branch instruction (branch). The instructions are executed in the order shown by the arrow on the right-hand side of FIG. 4. The four instructions, for example, specified by the continuous addresses are considered as a block.

The instruction address register 14 of FIG. 3 is divided into areas of a block offset, a line address, and a tag address. Two cache RAMs 17 and 18 are accessed by the line address and the block address, and output a specified instruction. The line address is used in order to limit an area in the cache RAMs 17 and 18 wherein instructions from the external RAM 12 are to be stored. For example, an instruction stored in the addresses xxxx and yyyy of the external RAM 12 is stored in zzz of the cache RAM 17 or 18. If the instruction is allowed to be stored in an arbitrary storage area of the cache RAM 17 or 18, accessing the cache RAM 17 and 18 will take time.

Here, the instruction read from the external RAM 12 can be stored in the two cache RAMs 17 and 18. In this case, it is said that the degree of association is 2. The cache RAMs 17 and 18 may be configured by discrete memory chips, or by splitting a storage area of one memory chip.

The block offset specifies an instruction within a block from a line address. For example, an "add" instruction to add in the first line of FIG. 4 is specified by the line address, and the instructions of "add", "subcc", "or", and "set" are specified by changing the block offset from "00" to "01", "10", and "11."

The tag RAMs 15 and 16 output a tag address in accordance with the line address. Comparators 19 and 20 compare the tag addresses read from the tag RAMs 15 and 16, respectively, with the tag address read from the instruction address register 14 to determine whether they match. When an instruction specified by the line address is stored in the cache RAM 17, the comparison result of the comparator 19 is a match (cache hit). To the contrary, when the instruction specified in the line address is stored in the cache RAM 18, the comparison result of the comparator 20 is a match (cache hit).

The hit/miss checking logic circuit 21 controls the selector 22 according to an output of the comparators 19 and 20. If the comparator 19 outputs a match signal, the selector 22 will select the cache RAM 17, and if the comparator 20 outputs a match signal, the selector 22 will select the cache RAM 18. The selected instruction is supplied to the execution unit 11.

FIG. 5 shows the above-described process where the tag address read from the tag RAM 15 and the tag address read from the instruction address register 14 are in agreement. In the drawing, thick lines indicate flows of the address, the instruction, and a signal and the like used in the read-out operation.

FIG. 6 shows a case where comparison results of both comparators 19 and 20 were negative (cache miss). In the drawing, thick lines indicate flows of the address, the instruction, and the signal used in write-in operation. In this case, the instruction is read from the external RAM 12 and is written into the cache RAM 17 or the cache RAM 18. FIG. 6 shows an example in which the instruction read is written into the cache RAM 17. Further, the tag address of the instruction address that was missed is written in the tag RAM 15 that corresponds to the cache RAM 17. Further, the instruction stored in the cache RAM 17 is read, and supplied to the execution unit 11 through the selector 22.

However, there is a problem in the conventional instruction cache described above.

FIG. 7 shows a sequence of instruction reading from the instruction cache 13 configured as shown in FIG. 3. In order to clearly illustrate flows of an address and the like, some of the reference numbers given to the components shown in FIG. 3 are omitted. In FIG. 7, one instruction is made of 4 bytes and 1 block is made of four instructions (that is, 1 block includes 16 bytes). Moreover, the number of lines is 128. The read-out sequence starts at a step (a) and ends with a step (e).

Suppose that an instruction address of "0x00000000" is supplied from the execution unit 11, and stored into the instruction address register 14. In this case, the line address is "0000000" and the block offset is "00." At the step (a), it is assumed that the tag address of the instruction address is the same as the tag address read from the tag RAM 15. Therefore, the hit/miss checking logic circuit 21 selects the cache RAM 17 by controlling the selector 22. For example, the addition instruction "add" of FIG. 4 is read from the cache RAM 17.

Next, the instruction address "0x00000004" is stored in the instruction address register 14 in the step (b). In this case, the block offset is incremented by one from "00", and it is set to "01". Since the line address does not change, the cache RAM 17 stays selected and an instruction corresponding to the block offset "01" is chosen (subtraction instruction "subcc" in FIG. 4).

Further, the block offset is set to "10" and "11" in accordance with the instruction address "0x0000008" and "0x000000c", respectively, and an "or" instruction "OR" and a set instruction "SET" are respectively read from the cache RAM 17 (steps (c) and (d)). The line address does not change in the meantime, however.

Next, when the instruction address changes to "0x00000010" at the step (e), the line address will be incremented by one to become "0000001." At the step (e), it is assumed that the tag address of the instruction address is the same as the tag address read from the tag RAM 16. Therefore, the hit/miss checking logic circuit 21 selects the cache RAM 18 by controlling the selector 22.

Throughout the steps from (a) to (e) that are specified by the address indicative of the continuous instructions, the cache RAM 18 was performing read-out operation although it was not selected. Where one or more cache RAMs are marked with a thick lined circle in the drawing, it indicates that the cache RAM is in an enabled state (it is also called an active state). Therefore, the problem is that useless power is consumed.

SUMMARY OF THE INVENTION

It is a general object of the present invention to provide an apparatus that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a data processing apparatus with an instruction cache, which can operate with low power consumption, solving the problem of the above-mentioned conventional technology, and avoiding the useless power consumption.

The above-mentioned objective can be attained by a data processor with a plurality of cache memory units, wherein only a cache memory which stores demanded instructions is enabled, while other cache memory units are disabled (it is also called being in an inactive state). Since a cache memory that does not store the demanded instructions is disabled, power is not consumed. That is, only the cache memory that stores the demanded instructions consumes power. Therefore, useless power consumption by other memory units is avoided and the instruction cache with low power consumption can be realized.

DESCRIPTION OF THE PREFERRED EMBODIMENTS

In the following, embodiments of the present invention will be described with reference to the accompanying drawings.

Figure 7:
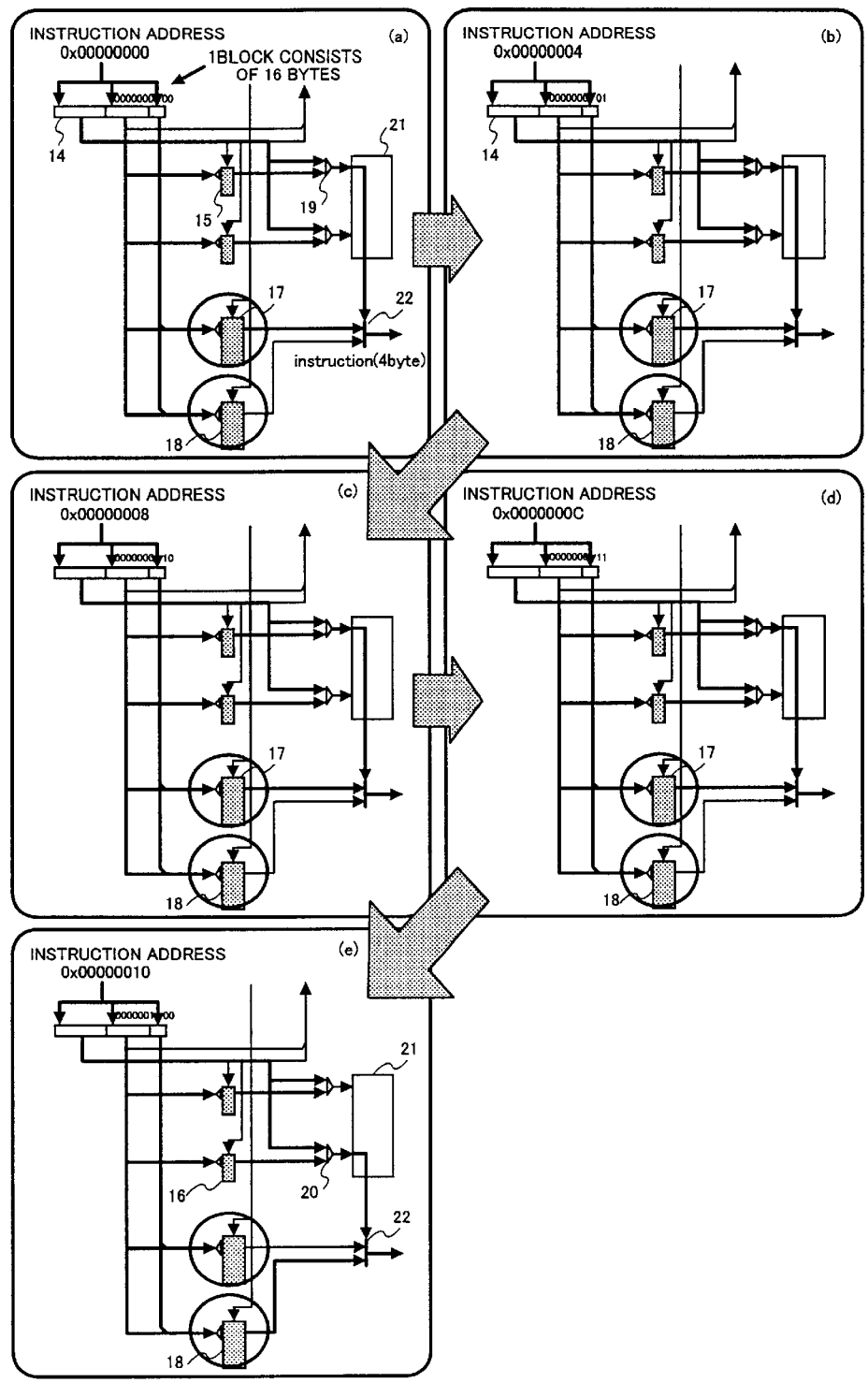
FIG. 7 shows detailed read-out operation of the instruction cache shown in FIG. 3 for every step.
Figure 8:
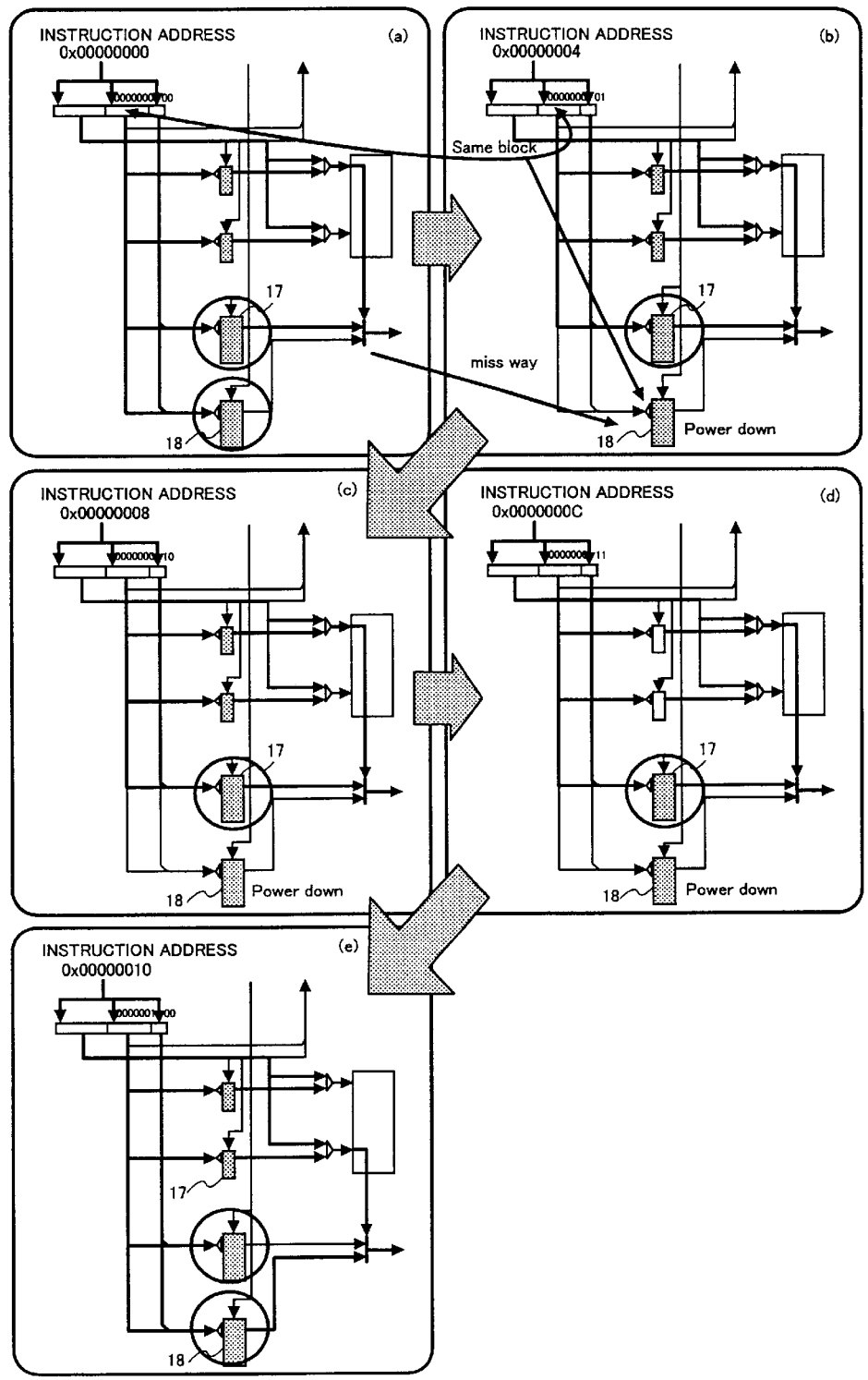
FIG. 8 shows the principle of this invention in reference with the read-out operation of FIG. 7.

FIG. 8 is a drawing describing the principle of this invention. In order to clarify differences from the read-out sequence shown in FIG. 7, the read-out sequence with this invention applied to the configuration of FIG. 7 is illustrated in FIG. 8. Therefore, the configuration of the instruction cache shown in FIG. 8 is the same as the configuration of the conventional instruction cache shown in FIG. 3 or FIG. 7 for convenience.

According to this invention, the cache RAM 18 which does not store instructions demanded by the steps (b), (c), and (d) is disabled (the cache RAM 18 in the disabled state is not marked by the thick lined circle). In other words, only the cache RAM 17 which stores the instructions demanded by the steps (b), (c), and (d) is enabled (the cache RAM 17 in the enabled state is marked by the thick lined circle). Thereby, the power consumption by the instruction cache memory units can be reduced.

What is necessary is just to stop supplying the address to memory units that do not store the instruction demanded by the steps, in order to disable cache RAM(s).

As descried, the mechanism to disable the memory units that do not store the instructions demanded by the steps is based on the fact that the instructions in the same block have the same line address, and that the instructions in the same block are stored in the same cache RAM. At the step (a), the first instruction of the block is read. In this case, both cache memory units are activated, and the cache RAM 17 is found to hit. While it is theoretically possible to disable the cache RAM 18, considerable time will be required, extending access time. Therefore, in order to shorten the access time, both cache RAMs are enabled at the step (a).

At the step (b), the line address stays the same. That is, at the step (b), the same cache RAM 17 as the step (a) surely hits. Therefore, the cache RAM 18 which does not store the instructions demanded at the step (a) is disabled. Since the line address stays the same again at the step (c) also, the cache RAM 18 stays disabled. Since the line address stays the same again at the step (d), the cache RAM 18 stays disabled.

At the step (e) where the line address changes, both cache RAMs 17 and 18 are enabled like in the step (a).

Thus, it becomes possible to cut down power consumption by disabling the cache RAMs which do not store the instructions when reading remaining instructions in the same block, although all the cache RAMs are enabled when reading the first instruction in the block.

Figure 1:
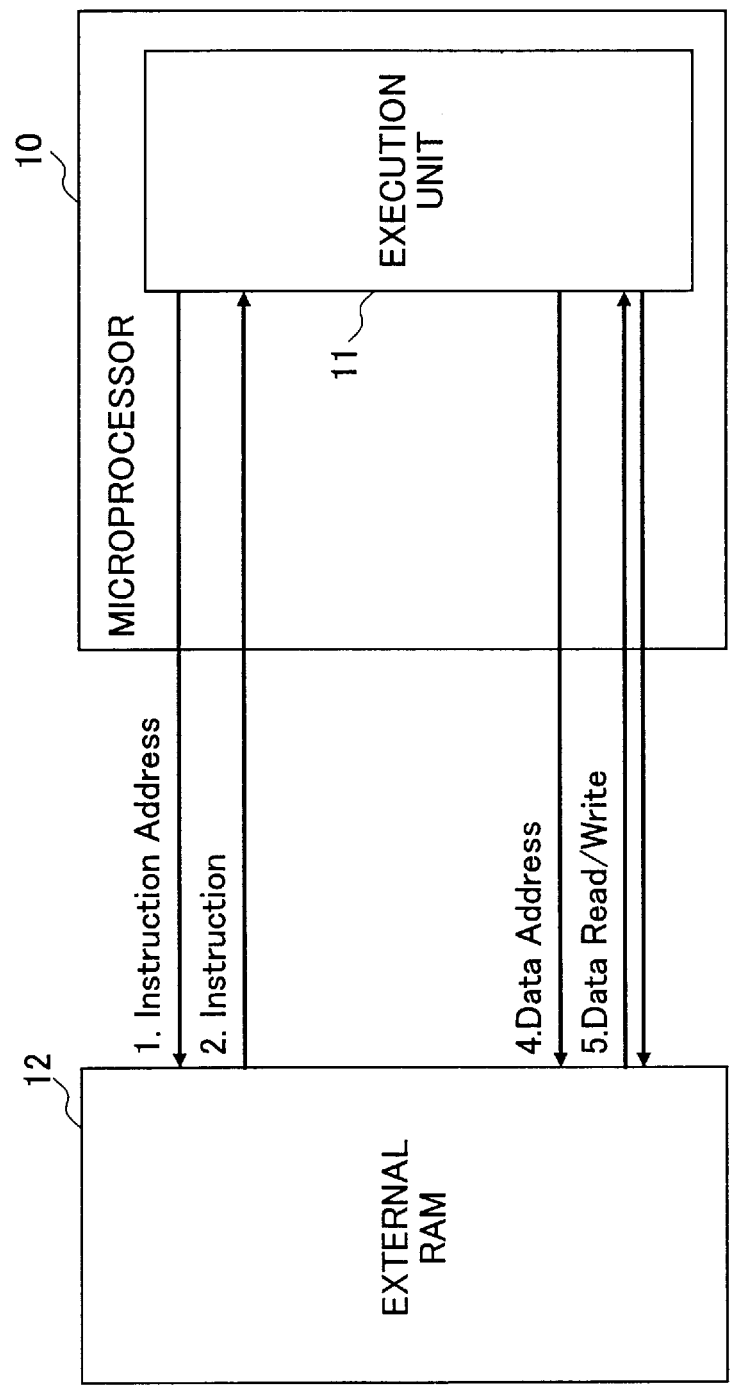
FIG. 1 shows a configuration of a conventional microprocessor.
Figure 2:
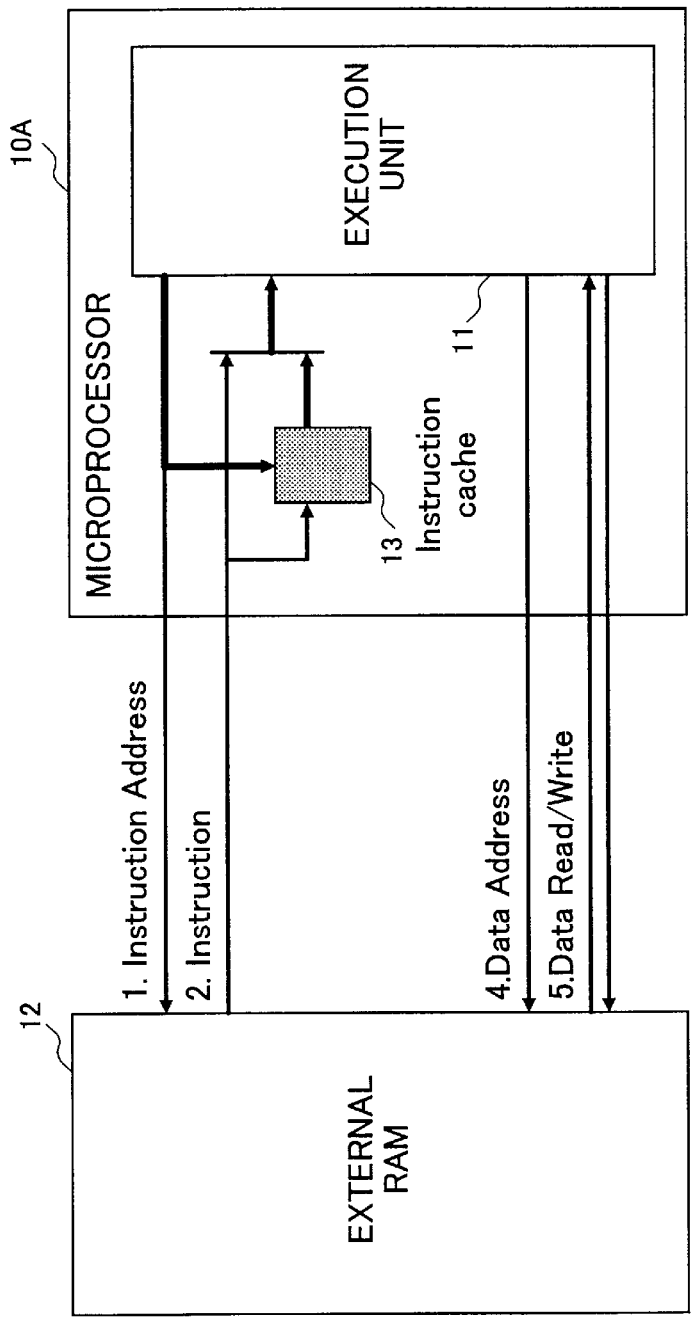
FIG. 2 shows another configuration of the conventional microprocessor.
Figure 3:
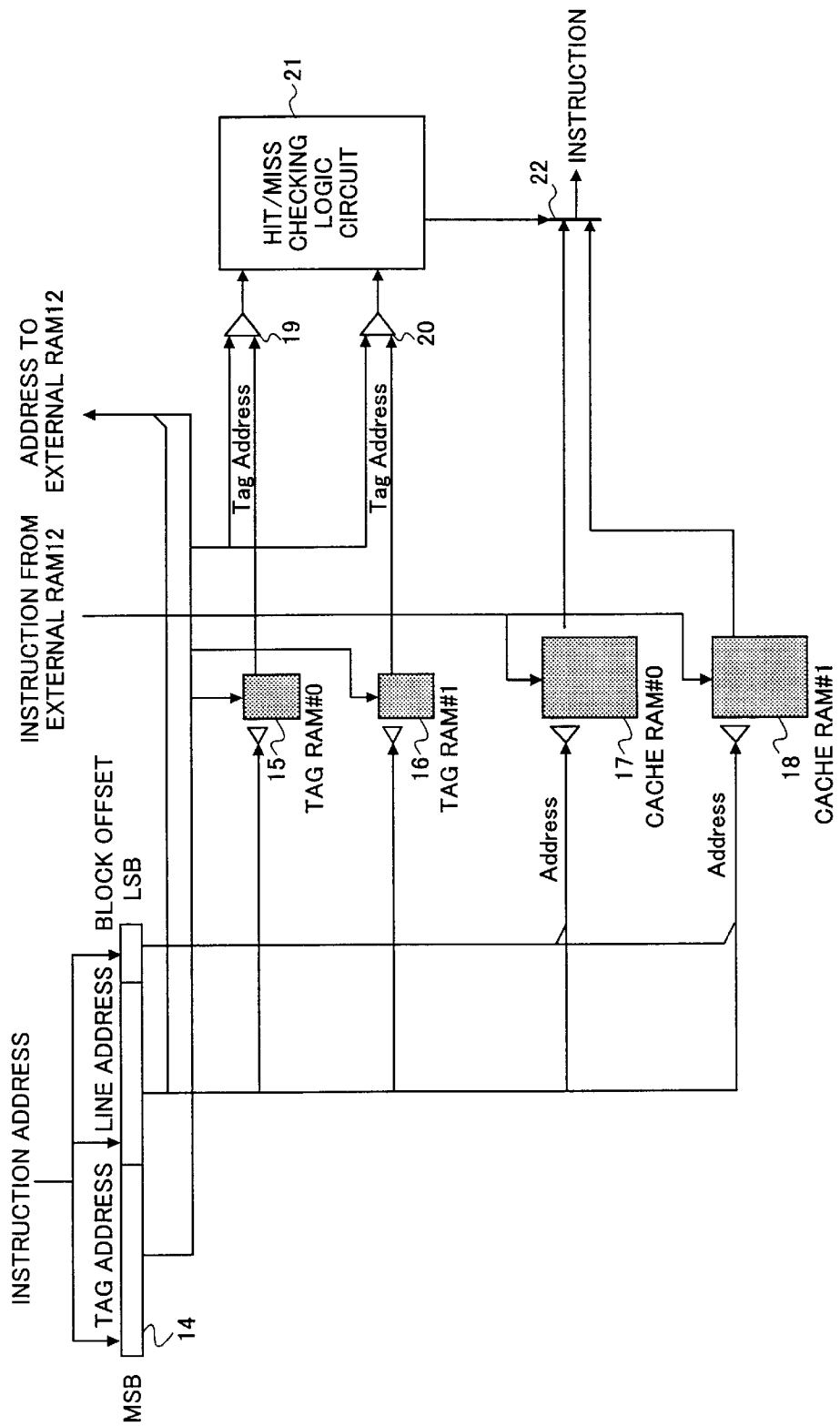
FIG. 3 is a block diagram showing a configuration of an instruction cache 13 shown in FIG. 2.
Figure 4:
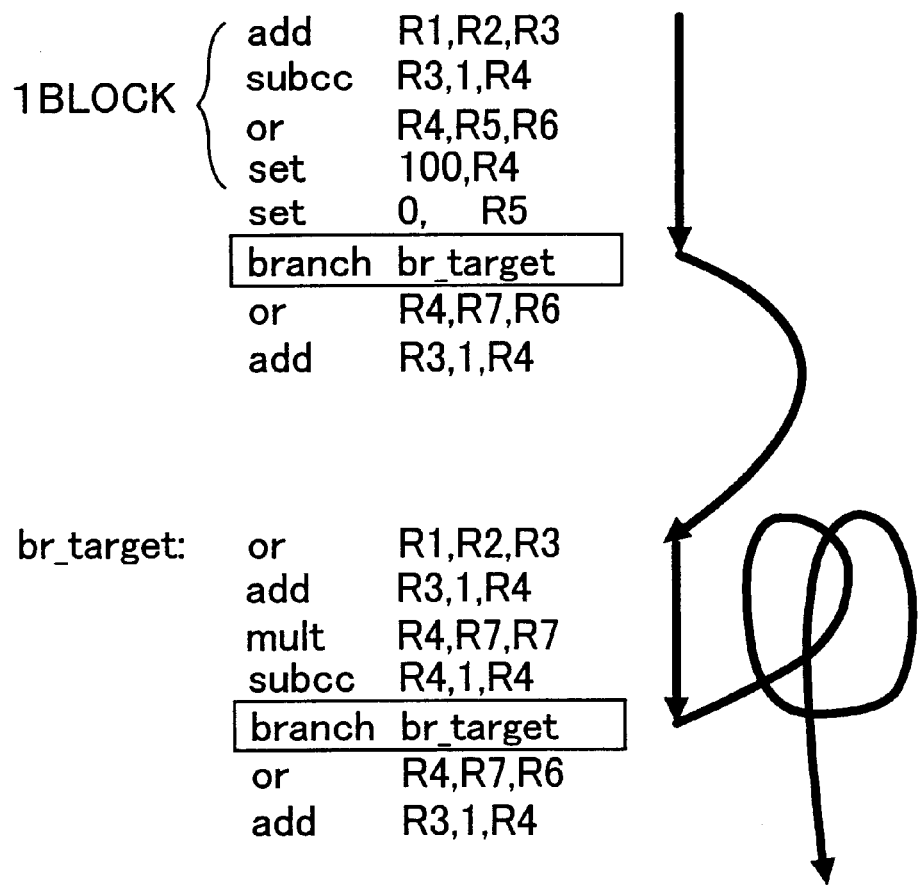
FIG. 4 shows an example of instructions being executed sequentially.
Figure 9:
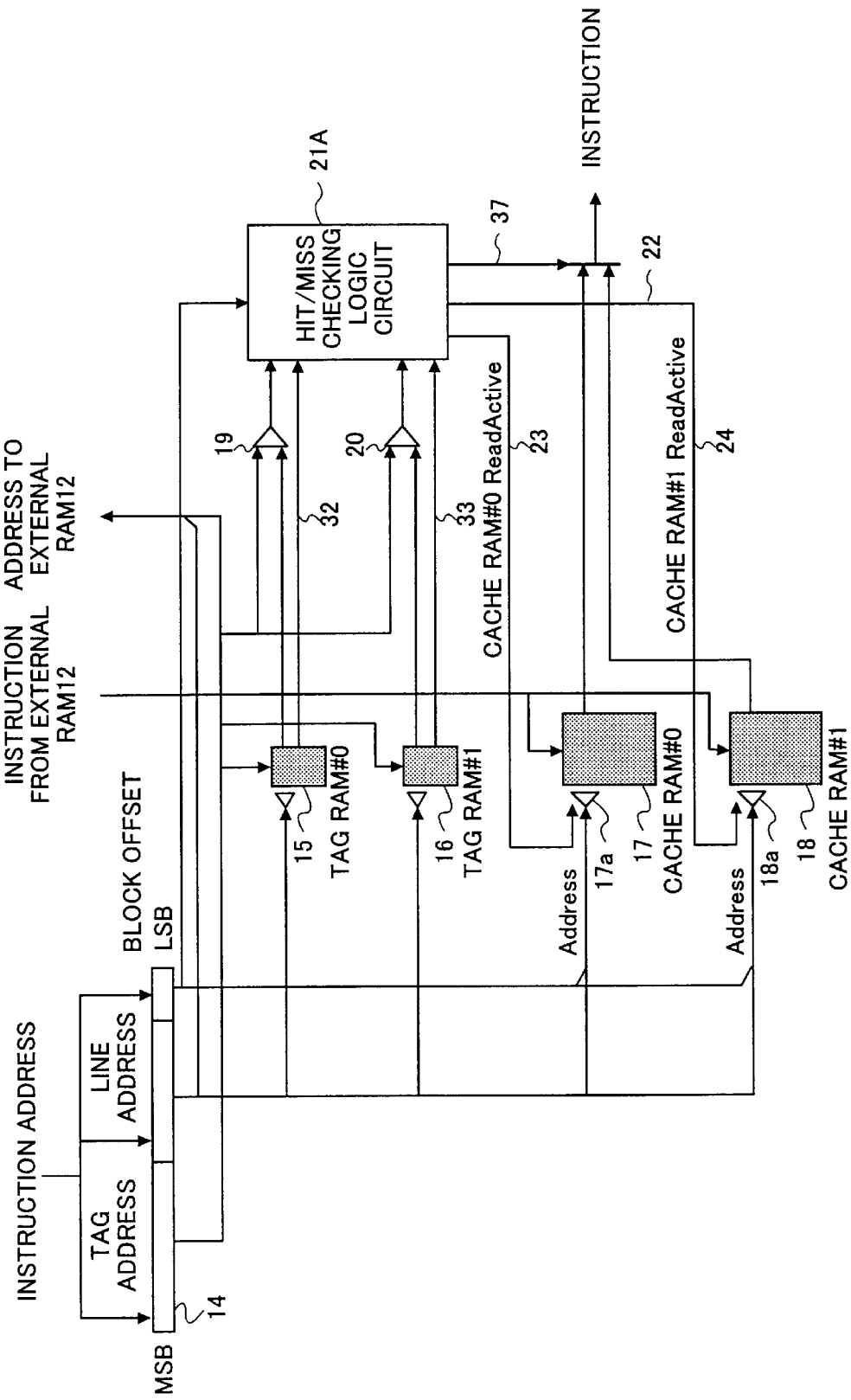
FIG. 9 shows a configuration of the instruction cache of the first embodiment of this invention.

FIG. 9 is a block diagram showing the configuration of the instruction cache of the embodiment of this invention. In the drawing, the same reference number is given to the same component as shown in FIG. 3. The configuration of FIG. 9 is included in the instruction cache 13 shown in FIG. 2, and a system is structured by a data processor, such as a microprocessor and the like, that includes this instruction cache, and the external RAM 12.

The instruction cache shown in FIG. 9 includes a hit/miss checking logic circuit 21A in place of the hit/miss checking logic circuit 21 shown in FIG. 3. The hit/miss checking logic circuit 21A controls, in addition to controlling the selector 22, the disabled status of the cache RAM which does not store the instructions demanded, by checking whether the line address has changed, and keeps the disabled status if the line address has not changed, as described with reference to FIG. 8. Further, according to this checking result, cache RAM read-out effectuating signals 23 and 24 are outputted to the cache RAMs 17 and 18, respectively, to set the cache RAMs to an enabled state and a disable state accordingly.

The cache RAM read-out effectuating signals 23 and 24 are supplied to logic gates 17a and 18a. When the cache RAM read-out effectuating signals 23 and 24 are ENABLE (ON), the address is given to the cache RAMs 17 and 18 and the address is not supplied to the cache RAMs 17 and 18 if the signals are DISABLE (OFF). Here, when the cache RAMs 17 and 18 are structured by individual chips, the cache RAM read-out effectuating signals 23 and 24 are given to the chip-select terminal or the like of each chip.

Figure 10:
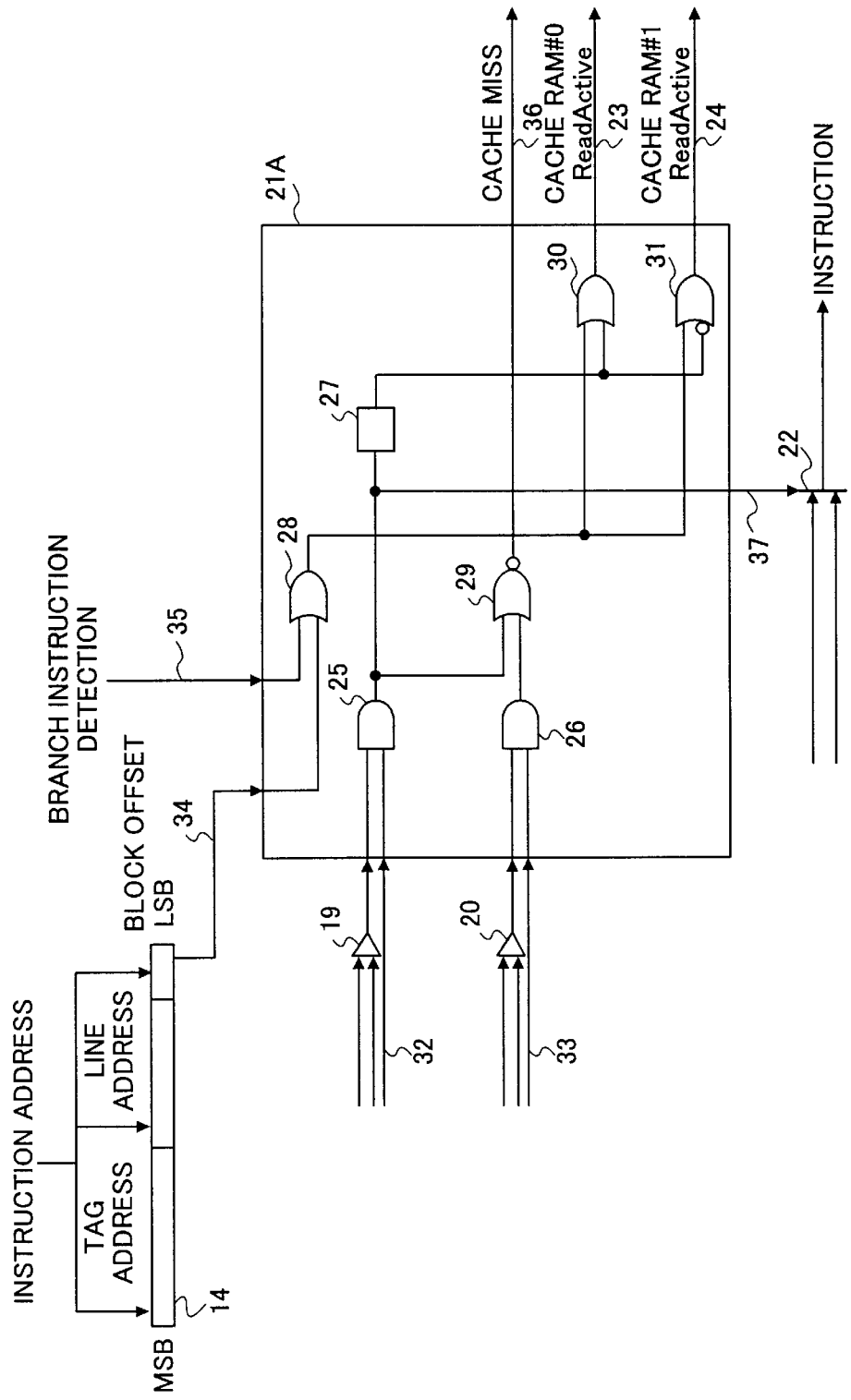
FIG. 10 is a circuit diagram showing an example of a hit/miss checking logic circuit shown in FIG. 9.

FIG. 10 is a circuit diagram showing an example of a configuration of the hit/miss checking logic circuit 21A. The hit/miss checking logic circuit 21A has AND gates 25 and 26, a flip-flop 27 and OR gates 28, 30, and 31, and a NOR gate 29. Incoming signals to the hit/miss checking logic circuit 21A are comparison results of comparators 19 and 20, entry effectuating signals 32 and 33 indicative of whether effective instructions are stored in the address read from tag RAMs 15 and 16, a signal 34 indicative of the first instruction in the block in the same line address, and a branch detection signal 35 indicative of a new address by a branch instruction. Further, outputs of the hit/miss checking logic circuit 21A are a cache-miss signal 36, cache RAM read-out effectuating signals 23 and 24, and a selector control signal 37.

Checking logic in FIG. 10 is described with reference to FIG. 8 and FIG. 9.

First, when an instruction address indicates the head of a block, or when it becomes a new address by a branch instruction, the signal 34 or the signal 35 is set to ON (HIGH), and is supplied to the OR gates 30 and 31 through the OR gate 28. Then, the OR gates 30 and 31 set the cache RAM read-out effectuating signals 23 and 24 to ON (HIGH). Thereby, the cache RAMs 17 and 18 are enabled. When the entry effectuating signals 32 and 33 are OFF (LOW) at this time, the outputs of the AND gates 25 and 26 are LOW, and the cache miss signal 36 of LOW is outputted through the OR gate. If this is outputted, the external RAM 12 shown in FIG. 2 will be accessed, and write-in operation of an instruction will be performed (operation of FIG. 12 will be described later).

To the contrary, when the output of the comparator 19 or 20 indicates a matching of the tag address, and the corresponding entry effectuating signal 32 or 33 is HIGH (ON), indicating an effectiveness, a cache miss signal is put into HIGH, indicating that a cache hit. For example, if the output of the comparator 19 shows matching of the tag address, while the output of the AND gate 25 will become HIGH, and the control signal 37 is supplied to the selector 22 and the cache RAM 17 is selected, the flip-flop 27 is set to 1. Thereby, it is memorized by the flip-flop 27 that the cache hit was detected by the system #0 (cache RAM 17). If, to the contrary, the output of the comparator 20 shows the matching of the tag address, the output of the AND gate 26 will become HIGH. At this time, the control signal 37 is still LOW, and the selector 22 selects the cache RAM 18. In addition, the flip-flop 27 is reset to 0. That is, the flip-flop 27 functions as a storage means to memorize the data indicative of which cache memory hit. The above operation is performed at the step (a) of FIG. 8.

Next, when the instruction address is not the head of a block, or when there is no branch instruction, the output of the OR gate is LOW. Then, one of the cache RAMs is enabled using the value stored in the flip-flop 27. If 1 is set to the flip-flop 27, the output of the OR gate 30 is HIGH, the output of the OR gate 31 is LOW, the cache RAM read-out effectuating signal 23 is OFF, and the cache RAM read-out effectuating signal 24 is ON. On the other hand, if 0 is set to the flip-flop 27, the output of the OR gate 30 is LOW, the output of the OR gate 31 is HIGH, the cache RAM read-out effectuating signal 23 is OFF, and the cache RAM read-out effectuating signal 24 is ON. The selector 22 selects one of the cache RAMs according to the control signal 37. In the steps (b) through (d) of FIG. 8, since operation is for the same line address, the output of the AND gate 25, i.e., the control signal 37, is HIGH. Therefore, the selector 22 selects the cache RAM 17. Moreover, in the steps (b) through (d), since 1 is set to the flip-flop 27, the cache RAM read-out signal 23 stays turned on.

Thus, the hit/miss checking logic circuit 21A provides a control method of an instruction cache having a plurality of cache memory units, and realizes the control method that enables a cache memory which stores demanded instructions, and disables other cache memory units.

Figure 5:
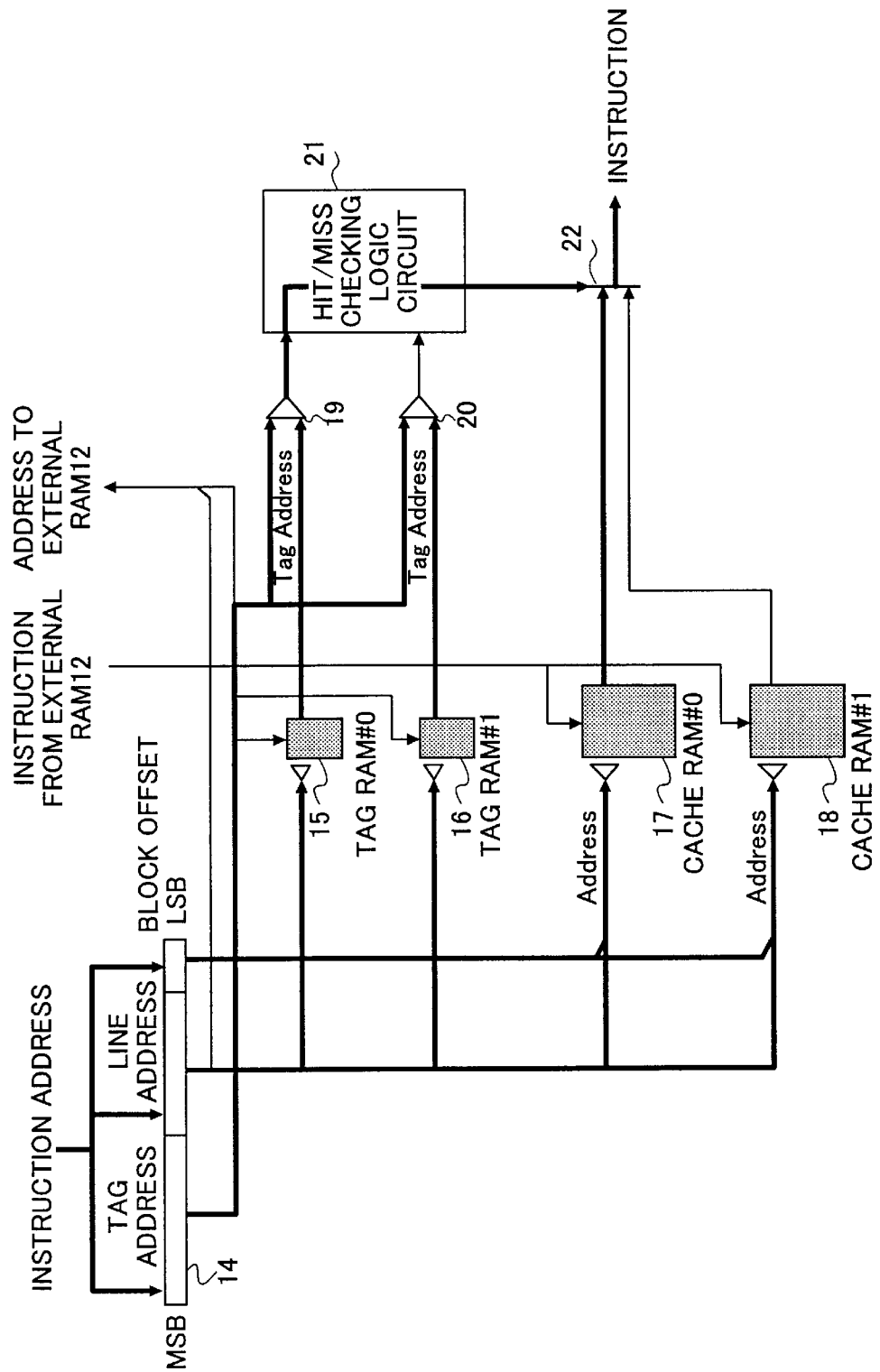
FIG. 5 shows operation of the instruction cache shown in FIG. 3.
Figure 11:
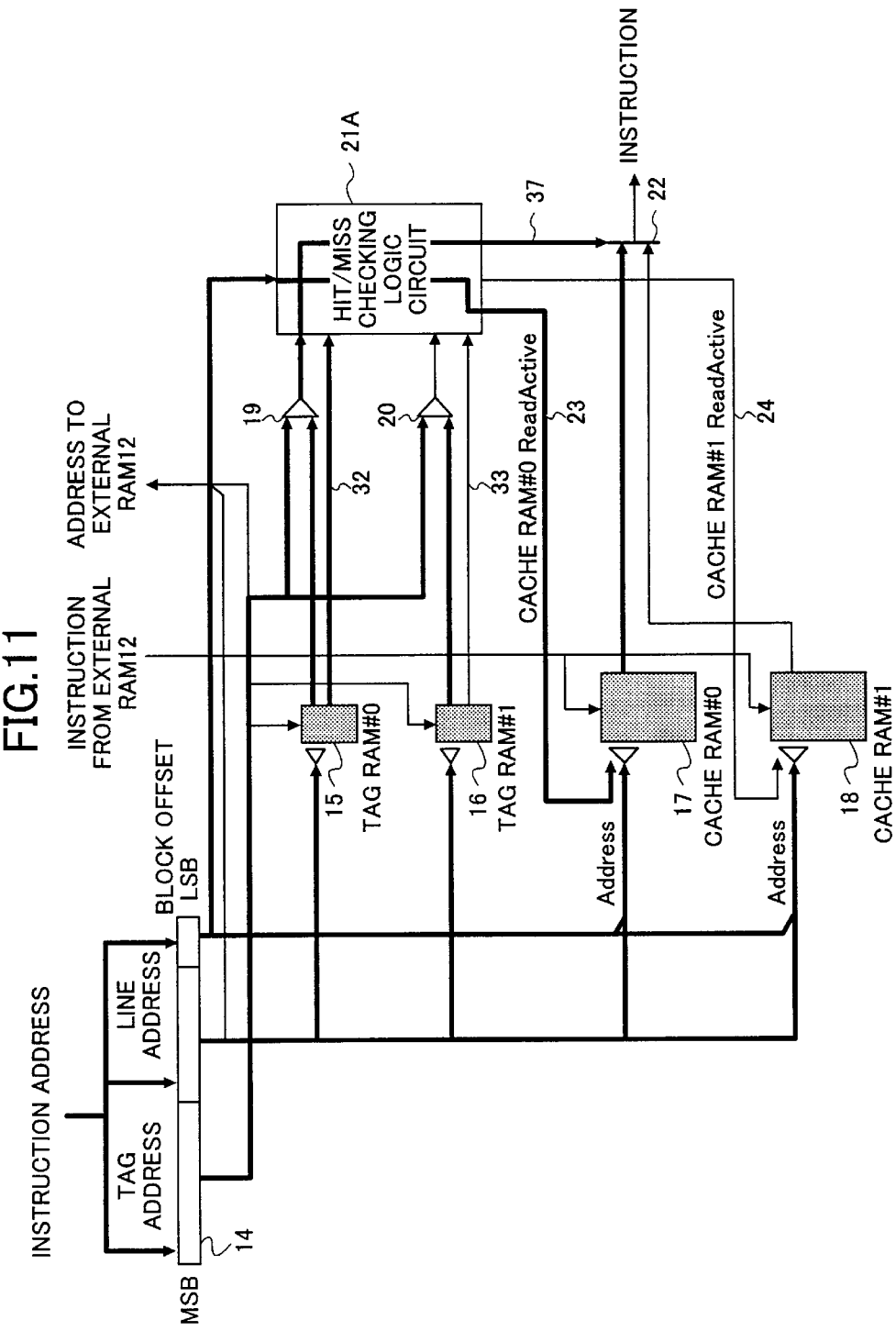
FIG. 11 shows operation of the instruction cache shown in FIG. 8.

FIG. 11 is a drawing that shows how an instruction is read from an instruction cache according to the above-mentioned checking logic, and corresponds to FIG. 5 given above.

Figure 6:
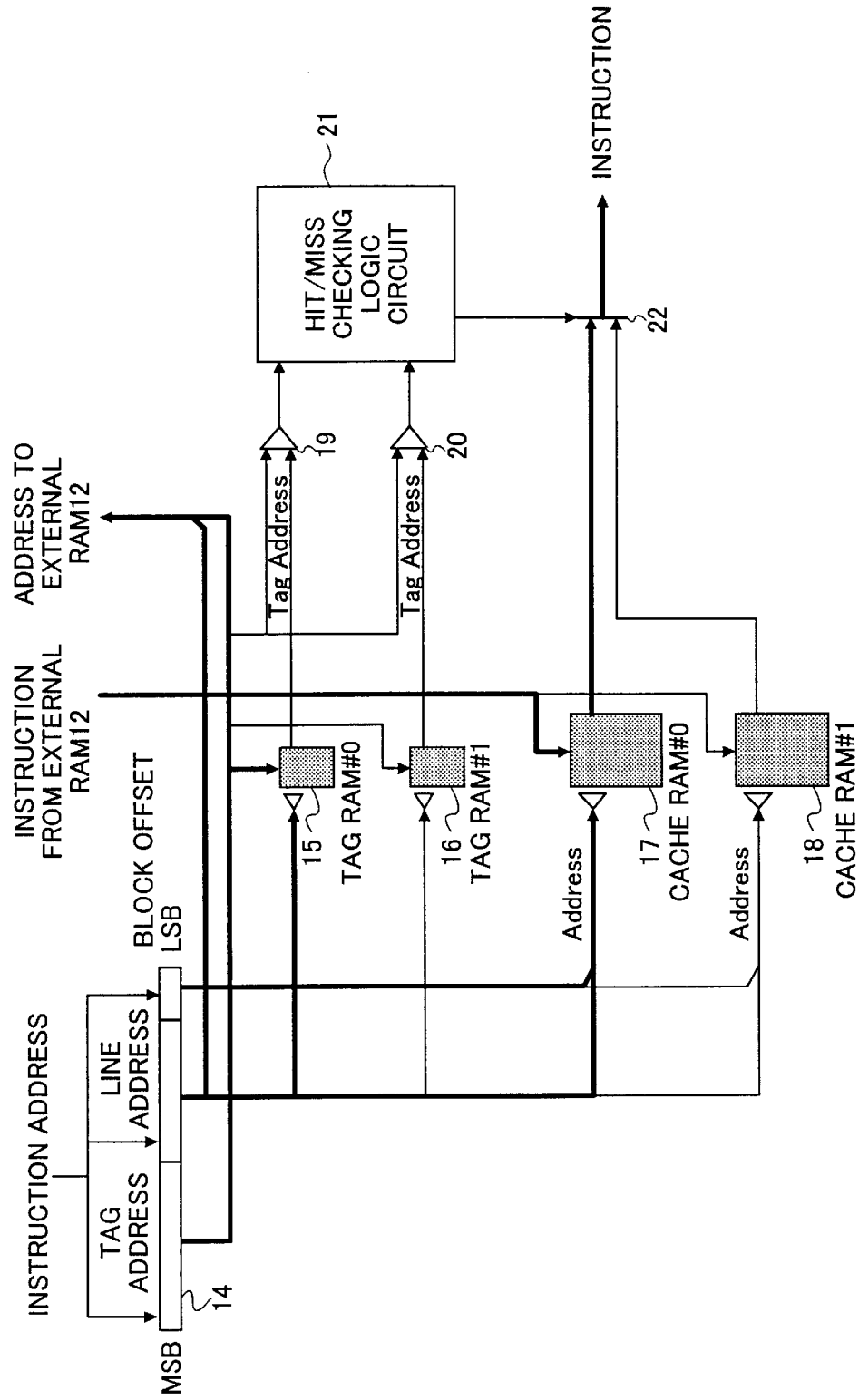
FIG. 6 shows another operation of the instruction cache shown in FIG. 3.
Figure 12:
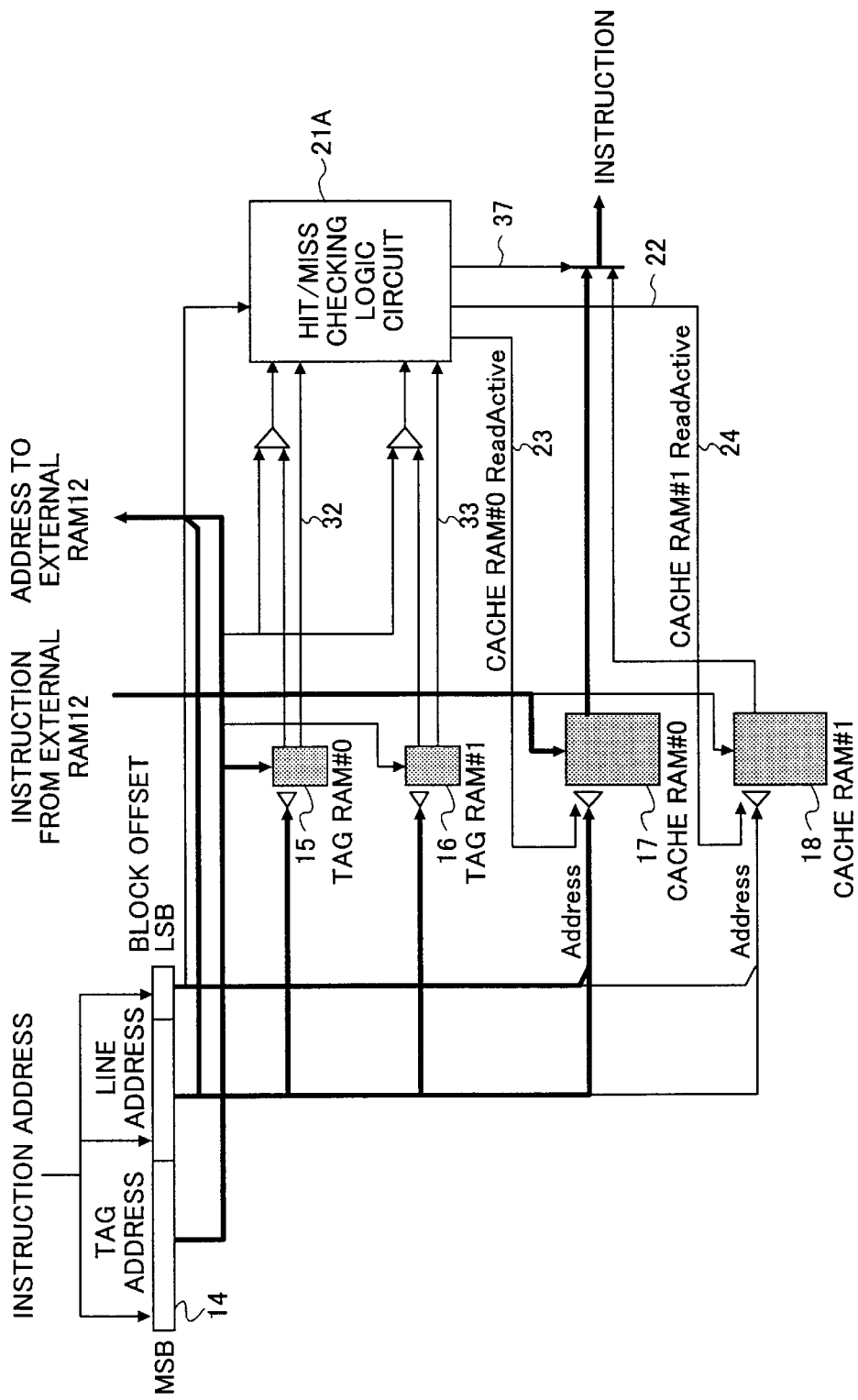
FIG. 12 shows another operation of the instruction cache shown in FIG. 8.

Moreover, FIG. 12 shows operation when the cache miss signal 36 is turned on, according to the above-mentioned checking logic, and corresponds to FIG. 6 given above. An instruction is read from the external RAM 12 shown in FIG. 2, and is written in one of the cache RAMs (the cache RAM 17 in the example of FIG. 12) like the operation described with reference to FIG. 6.

In the above, the embodiment of this invention is described. This invention is not limited to the above-mentioned embodiments. For example, the number of cache RAMs may be three or more. In other words, the degree of association may be three or more.

Since a cache memory that does not store instructions demanded from an execution unit of a processor is disabled according to this invention as explained above, useless power consumption can be avoided and a data processor with an instruction cache with a low operation power can be offered.

Further, the present invention is not limited to these embodiments, but various variations and modifications may be made without departing from the scope of the present invention.

The present application is based on Japanese priority application No. 2000-391369 filed on Dec. 22, 2000, with the Japanese Patent Office, the entire contents of which are hereby incorporated by reference.

What is claimed is:

1. A data processor which has an instruction cache, comprising:
   a plurality of cache memory units; and
   a checking logic circuit that enables all said cache memory units in response to a detection of a first instruction that is read in a block of continuous instructions, and enables only one of the cache memory units while disabling other cache memory units when reading subsequent instructions in the block, said detection of the first instruction being indicated by a logical sum between a block-offset bit and a detection of a branch instruction.

2. The data processor as claimed in claim 1 wherein the checking circuit comprises a storage unit configured to store the data indicative of which cache memory unit hit, and controls enabling and disabling of the plurality of cache memory units, using the data in the storage unit.

3. A method of controlling a plurality of cache memory units, comprising:
   reading a first instruction in a block of continuous instructions;
   detecting whether the first instruction is a branch instruction to produce a first result;
   performing a logical sum of a block-offset bit and the first result to produce a second result; and
   enabling one of the cache memory units while disabling other cache memory units based on the second result.

4. A data processor, comprising:
   a plurality of cache memory units;
   an execution unit which reads an instruction;
   a checking logic circuit enabling only one of the cache memory units and disabling other cache memory units when the instruction is not a branch instruction and is not a first instruction in a block of continuous instructions.

* * * * *